Jan. 25, 1966 O. J. MELHUS 3,231,762
TUNNEL-DIODE READ-OUT AMPLIFIER FOR EVALUATING DATA FROM MAGNETIC DATA-STORAGE DEVICES
Filed Feb. 20, 1963
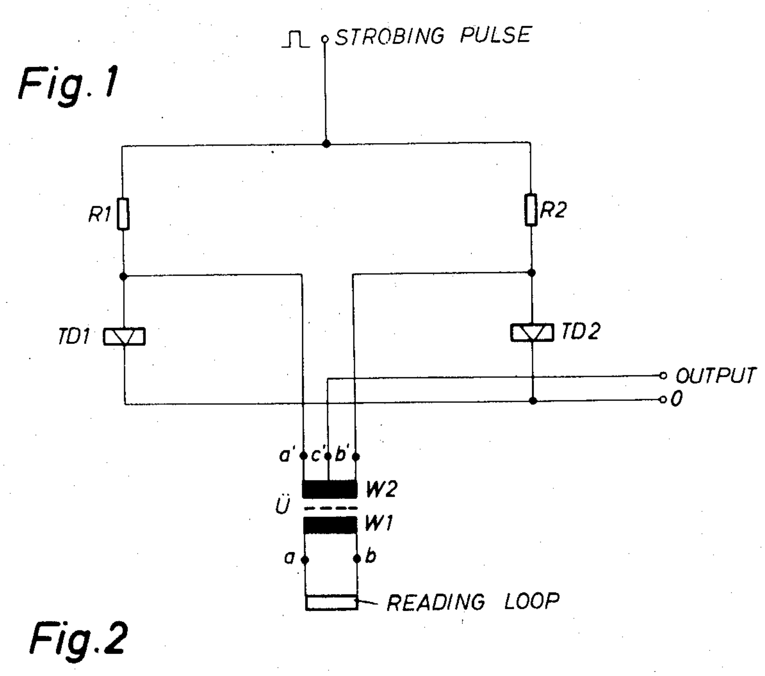
Fig. 2
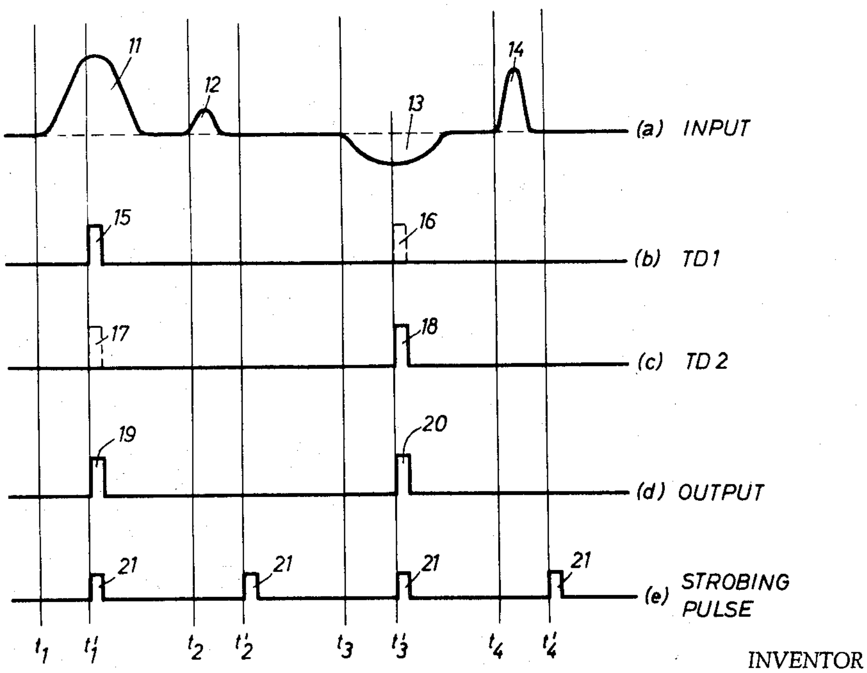
INVENTOR
OLE JOHAN MELHUS
BY Percy P. Lantzy
ATTORNEY United States Patent Office 3,231,762
Patented Jan. 25, 1966

3,231,762
TUNNEL-DIODE READ-OUT AMPLIFIER FOR EVALUATING DATA FROM MAGNETIC DATA-STORAGE DEVICES

Ole Johan Melhus, Ludwigsburg, Germany, assignor to International Standard Electric Corporation, New York, N.Y., a corporation of Delaware Filed Feb. 20, 1963, Ser. No. 259,932
Claims priority, application Germany, Feb. 24, 1962, St 18,898
1 Claim. (Cl. 307—88.5)

The present invention relates to an evaluating circuit comprising tunnel diodes, in particular to a read-out amplifier for ferrite-core storage devices, for the evaluation of bipolar input signals which are blanked out as unipolar output signals at predetermined time positions.

In a ferrite-core storage device, the read-out loop delivers output signals which may either have a negative or a positive polarity. Besides the useful signals, there also appear noise signals which, under certain circumstances, may be greater than the useful signals. The useful signals and the noise signals, however, do not appear simultaneously, and may therefore be separated from one another by being blanked out with respect to time. The useful signals "0" and "1" have different amplitudes and are separated from one another by a threshold of predetermined magnitude.

Besides the above-mentioned noise signals of the unswitched cores, other noise signals are likely to appear on account of capacitance in the read-out loop. These noise signals are eliminated with the aid of a balancing transformer.

Moreover, it is known to amplify the opposite-phase useful signals in two linear amplifying channels, and to rectify them with the aid of a full-wave rectifier circuit. Subsequently thereto, and with the aid of a gating circuit, the useful signals are blanked out with respect to time, and the discrimination between "0" and "1" is effected in a threshold circuit.

These conventional types of circuit arrangements, however, entail the disadvantage of very high cost caused by the two-channel amplification, and especially by having to use expensive high-frequency transistors, etc. in order to achieve good transmission properties of the linear amplifiers. Also, these circuit arrangements have a very high power consumption.

It is the object of the present invention to provide an evaluating circuit, in particular a read-out amplifier for ferrite-core storage devices, avoiding the disadvantages of the conventional types of arrangements, and having fewer sources of error due to a simpler construction. The evaluating circuit arrangement according to the invention is composed of tunnel diodes and is characterised by the fact that the input signals, in a manner known per se, are coupled in via a balanced transformer, that the secondary winding of this balanced transformer is connected to the anodes of two tunnel diodes which are connected together at their cathodes, with blanking-out pulses of a predetermined magnitude capable of being simultaneously applied between two series resistors connected to the respective anodes of the two tunnel diodes, and between the cathodes of the tunnel diodes which are connected with one another, so that the switching of the tunnel diodes is evaluated as a criterion for the unipolar output signals.

The unipolar output signals may be taken off between the center tap of the secondary winding and the cathodes of the respective tunnel diodes, which are connected to each another.

However, it is also possible to take off the unipolar output pulses directly at the electrodes of one of the tunnel diodes.

Besides having a very short switching time, the evaluating arrangement according to the invention also has the advantage, over the hitherto conventional types of arrangements, of being very inexpensive, because it operates simultaneously as an amplitude discriminator, as a blanking-out circuit and as an amplifier. The direct control of the inventive type of discriminator is possible because, in contrast to the conventional arrangements, the characteristic of the tunnel diode has a very sharp bend at very low current levels.

The evaluating circuit will now be explained in detail by means of an example of embodiment of a reading amplifier for ferrite-core storage devices with reference to FIGS. 1 and 2 of the accompanying drawing in which:

FIG. 1 shows a circuit diagram of the inventive type of reading amplifier, and

FIG. 2 shows the corresponding pulse sequence which characterizes the operation of the reading-amplifier circuit.

The two tunnel diodes TD1 and TD2 (FIG. 1) operate in a bistable fashion with the blanking-out pulse serving as the supply voltage. The blanking-out (strobing) pulse is applied to the two tunnel diodes respectively via the two resistors R1 and R2, and is so dimensioned that upon reading a "1," by the addition of these two pulses, the tunnel diode is caused to reverse its state, whereas in the case of a read-out "0," the tunnel diode will remain at normal.

Since the tunnel diodes TD1 and TD2 are controlled with opposite phase relations, each time one of the two tunnel diodes is switched upon appearance of a "1," depending on the polarity of the read-out signal. However, since both tunnel diodes are connected to each other via the secondary winding of the balanced transformer Ü, the state of the second tunnel diode, being controlled by the first tunnel diode, is reversed after a short time delay. For this reason, the output signal may be taken off at one of the two tunnel diodes. For balancing reasons, however, it is appropriate to take off the output signals between one center tap $c'$ of the secondary winding W2 and the zero lead 0.

FIG. 2 now shows a pulse diagram depicting the pulse shapes of the input signal (*a*), of the signal at the first tunnel diode TD1 (*b*), at the second tunnel diode TD2 (*c*), of the output signal (*d*) at the center tap of the transformer, and of the strobing pulse (*e*).

The first pulse 11 of the input signal (*a*) is positive and e.g. serves to bias the first tunnel diode TD1 to such an extent that this diode will be switched from its first to its second state upon arrival of the first strobing pulse 21. The switching of the first tunnel diode TD1, however, also causes the second tunnel diode TD2 to be switched to its second state and to transmit a pulse 17.

Small noise pulses 12 which are likely to be produce e.g. by half-selected cores, however, will remain ineffective, because they will already have died away by the time of arrival of the strobing pulses 21. This technique makes use of the fact that the useful signals have a greater voltage-time-integral than the noise pulses produced e.g. by half-selected cores. Satisfactory discrimination is even possible in cases where the amplitude of the noise signals (e.g. 14) is greater than that of the useful signals (e.g. 13).

In the case of negative useful signals 13, the state of the second tunnel diode TD2 is first switched (pulse 18) which, by the change of its state, will then cause the state of the first tunnel diode TD1 to be switched as well (pulse 16).

When using germanium tunnel diodes, the output voltage amounts to about 350 to 400 millivolts, which is sufficient for controlling a transistor.

In the case of very low input levels of the read-out signals, the evaluating circuit may still be preceded by an additional intermediate amplifier.

While I have described the principles of my invention in connection with specific apparatus, it is to be clearly understood that this description is made only by way of example and not as a limitation to the scope of my invention as set forth in the accompanying claim.

What is claimed is:

A read-out amplifier circuit for evaluation of bipolar input signals which are strobed at predetermined time positions, said read-out amplifier circuit comprising a balanced transformer having a primary winding and a secondary winding, said primary winding being coupled to a source of input signals, said secondary winding having a center tap and first and second signal taps; a first tunnel diode and a second tunnel diode, the anode of said first tunnel diode being coupled to said first signal tap to said secondary winding, the anode of said second tunnel diode being coupled to said second signal tap of said secondary winding; first and second impedances, a first terminal of said first impedance being coupled to said anode of said first tunnel diode, a first terminal of said second impedance being coupled to said anode of said second tunnel diode, the respective second terminals of said impedances being coupled to a source of strobing pulses; and a pair of output terminals coupled respectively to said enter tap of said secondary winding and to the cathodes of said first and second tunnel diodes, said respective cathodes of said first and second tunnel diodes being conductively coupled together.

References Cited by the Examiner

UNITED STATES PATENTS

| | | | |
|---|---|---|---|
| 3,096,449 | 7/1963 | Stucki | 307—88.5 |
| 3,127,574 | 3/1964 | Sommers | 307—88.5 |

DAVID J. GALVIN, *Primary Examiner.*

ARTHUR GAUSS, JOHN W. HUCKERT, *Examiners.*